United States Patent
Küster et al.

(10) Patent No.: US 6,412,868 B1
(45) Date of Patent: Jul. 2, 2002

(54) MOTOR VEHICLE SEAT WITH LORDOTIC SUPPORT

(75) Inventors: Peer Küster, Hannover; Mirco Polak, Stadthagen; Steffen Jaekel, Hiddenhausen; Claudia Gliese, Porta Westfalica, all of (DE)

(73) Assignee: Faurecia Autositze HmbH & Co. KG, Stadthagen (DE)

( * ) Notice: Subject to any disclaimer, the term of this patent is extended or adjusted under 35 U.S.C. 154(b) by 0 days.

(21) Appl. No.: 09/671,292

(22) Filed: Sep. 27, 2000

(30) Foreign Application Priority Data

Sep. 27, 1999 (DE) .......................... 199 46 156

(51) Int. Cl.$^7$ ................................ A47C 7/46
(52) U.S. Cl. ................................ 297/284.4
(58) Field of Search .............. 297/284.1, 452.29, 297/452.3, 284.4, 230.13, 230.1, 230.14

(56) References Cited

U.S. PATENT DOCUMENTS

| | | | | |
|---|---|---|---|---|
| 3,258,259 A | * | 6/1966 | Bohlin | 297/284.4 |
| 4,155,592 A | * | 5/1979 | Tsuda et al. | 297/284.1 |
| 5,507,559 A | * | 4/1996 | Lance | 297/284.5 |
| 5,797,652 A | * | 8/1998 | Darbyshire | 297/284.4 |
| 5,954,399 A | * | 9/1999 | Hong | 297/284.4 |
| 6,254,186 B1 | * | 7/2001 | Falzon | 297/284.1 |

FOREIGN PATENT DOCUMENTS

| | | |
|---|---|---|
| EP | 0 577 696 B1 | 10/1998 |
| WO | WO 93/05683 | 4/1993 |

* cited by examiner

*Primary Examiner*—David M. Purol
(74) *Attorney, Agent, or Firm*—Connolly Bove Lodge & Hutz, LLP

(57) ABSTRACT

A motor vehicle seat with a belt that can be stretched across the lower back portion of the seat. The belt can be tightened to varying degrees, and serves as a lordotic support. One end of the belt winds onto a belt drum that can be activated by a hand-operated wheel.

11 Claims, 5 Drawing Sheets

MOTOR VEHICLE SEAT WITH LORDOTIC SUPPORT

FIELD OF THE INVENTION

The invention relates to a motor vehicle seat with a belt that is embodied as a lumbar support.

BACKGROUND OF THE INVENTION

In the case of a motor vehicle seat of the known type (EP 05 77 696 B 1), a belt, which is led at one end in such a way that its position may be shifted, extends between the lateral capping pieces of a backrest. A curved element that is capable of being pivoted, as a result of whose repositioning the belt may be tightened to varying degrees, engages a cut-out of the belt or a slide that is connected to it by means of a cable. As a result of the cut-out, the belt is considerably weakened in terms of its sturdiness. Even the provision of a cable that transfers the tightening force is problematical. Furthermore, the range for repositioning the known belt is rather limited.

SUMMARY OF THE INVENTION

Taking this state of the art as a point of departure, it is the underlying task of the invention to embody a motor vehicle seat, of the type that may be presumed to be known, in such a way that the tension of the belt that constitutes the lumbar support may be repositioned across a wide area, and that the tensioning member can engage the belt without weakening it.

The resolution of this task is accomplished with the characteristics of a motor vehicle seat with a belt that is embodied as a lumbar support.

The lumbar support can be repositioned in an area whose size is practically arbitrary. The repositioning device saves space and is sturdy, and it can be housed in any ordinary backrest. The tensioning force is introduced to the belt uniformly across the entire cross-section of the belt so that the belt cannot be over-burdened at the point of engagement.

In what follows, a preferred embodiment form of the invention is described in detail by virtue of the drawings.

DETAILED DESCRIPTION OF THE INVENTION

Figure 1:
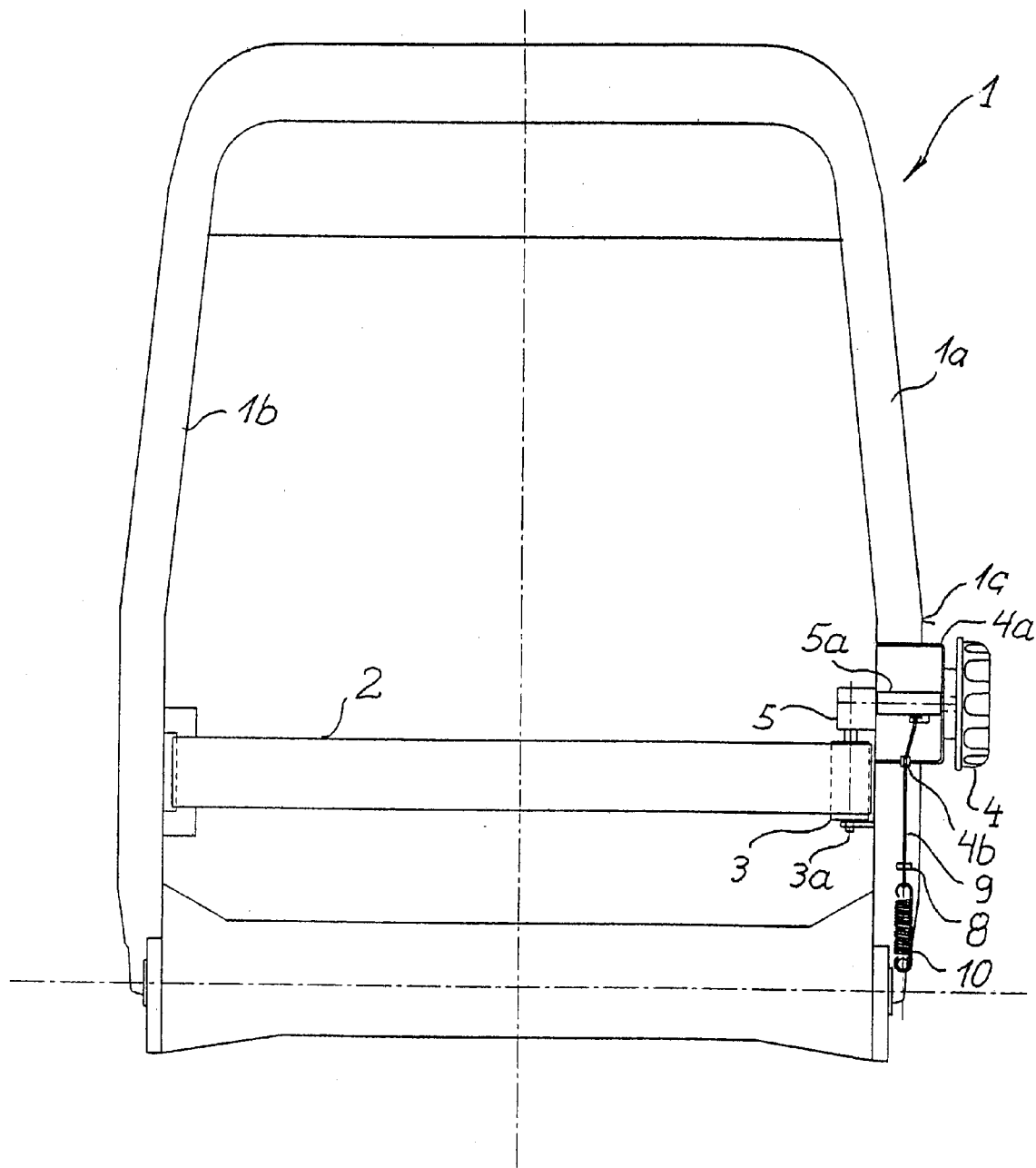
FIG. 1 shows the front view of a backrest with a lumbar support.

Only the frame of a backrest 1 of a motor vehicle seat, with lateral capping pieces 1a and 1b, is depicted in the drawings. In the region of the seat user's lumbar region, a belt 2 is stretched horizontally, as a lumbar support, from one lateral capping piece 1a to the capping piece that lies opposite it, 1b. One end of belt 2 is attached to the lateral capping piece 1a, whilst the other end is wound onto a belt drum 3. The belt drum 3 is seated so as to be capable of rotation around a winding axis 3a, likewise on lateral capping piece 1a.

On the lateral capping piece 1a, a flange 4a is provided in which a gear shaft 5a, with a horizontal axis which belongs to a set of gears 5 that is embodied as an angular gear that is attached by means of a flange to the lateral capping piece 1a, is seated so as to be capable of rotation. On the gear shaft 5a, a hand-operated wheel 4 is attached parallel to a lateral surface of the rest 1c. By way of the set of angular gears 5, the belt drum 3 is turned by the hand-operated wheel 4 around its winding axis 3a, which runs vertically. In the process, depending upon the direction of rotation, belt 2 is either wound onto belt drum 3 or is unwound off it.

One end of a draw rope 9, which passes through the flange 4a in a bore hole 4b, is attached to the circumference of the gear shaft 5a. A spring 10, which is attached so as to hang onto lateral capping piece 1a, engages at the other end of draw rope 9. On the draw rope 9, a stop 8, which lies against an opposing stop 4b of the flange 4a grips when the draw rope 9 is wound up onto gear shaft 5a.

Figure 3:
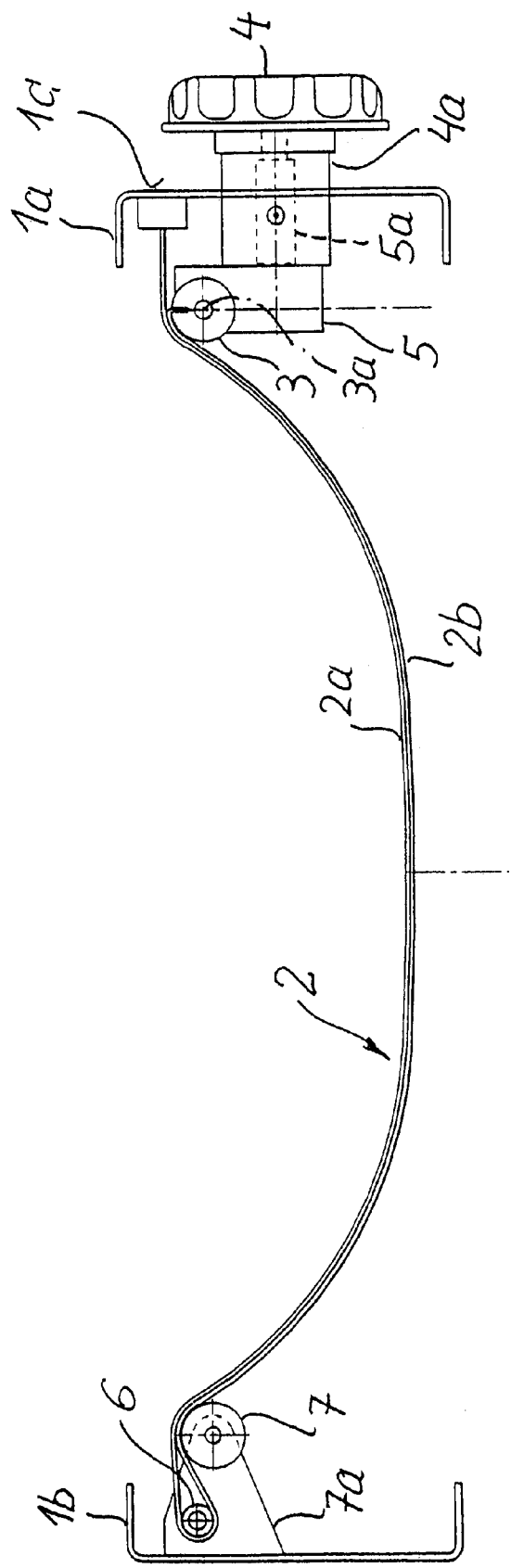
FIG. 3 shows a cross-section through the backrest according to FIG. 1 with a completely slackened lumbar support in keeping with FIG. 2.

According to FIG. 3, the belt 2 follows a course with a first portion of a conveyor 2a from a point of attachment on the lateral capping piece 1a to a deflection roller 6, and with a second portion of a conveyor 2b, from this deflection roller 6 to belt drum 3. The deflection roller 6 is seated on lateral capping piece 1b in such a way that it is capable of rotation by means of a strap 7a. In addition, a guide roller 7, which is capable of rotation around an axis that is parallel to the axis of the deflection roller 6, is also borne by the strap 7a. The guide roller 7 maintains contact between the first portion of the conveyor 2a and the portion of the conveyor that runs in the opposite direction, 2b.

In the depiction of FIG. 1, half of belt 2 is wound onto belt drum 3. The belt 2 runs in a position of medium tension. The draw rope 9 is completely unwound from gear shaft 5a, and spring 10 is, in large measure, relaxed. The hand-operated wheel 4 can be repositioned in either direction of rotation such that belt 2 is either unwound or wound up, depending upon the direction of rotation.

Figure 2:
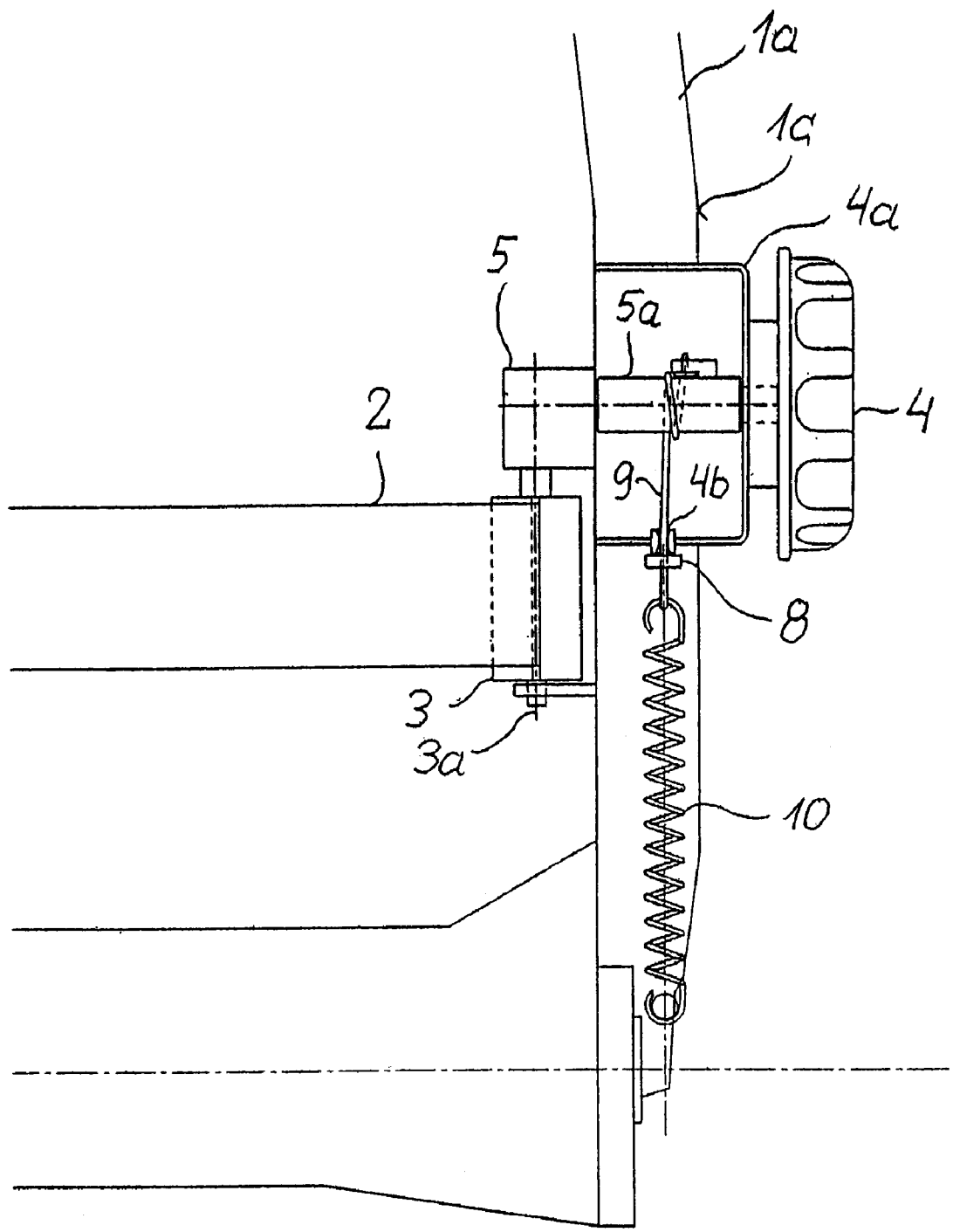
FIG. 2 shows an enlarged cut-out of the backrest with the repositioning device for the lumbar support according to FIG. 1 in the slackened state.

In FIGS. 2 and 3, belt 2 is depicted in the relaxed state. The hand-operated wheel 4 is turned in the counterclockwise direction. The draw rope 9 is wound onto gear shaft 5a, and spring 10 has been stretched. Belt 2 has completely unwound itself from belt drum 3. Due to the pressure exerted upon the belt by the seat's user and by the upholstery, the length of belt 2, which has become unwound from belt drum 3, has run so far around deflection roller 6 that one portion of conveyor 2a makes contact with the portion of the conveyor 2b connected to belt drum 3.

Figure 4:
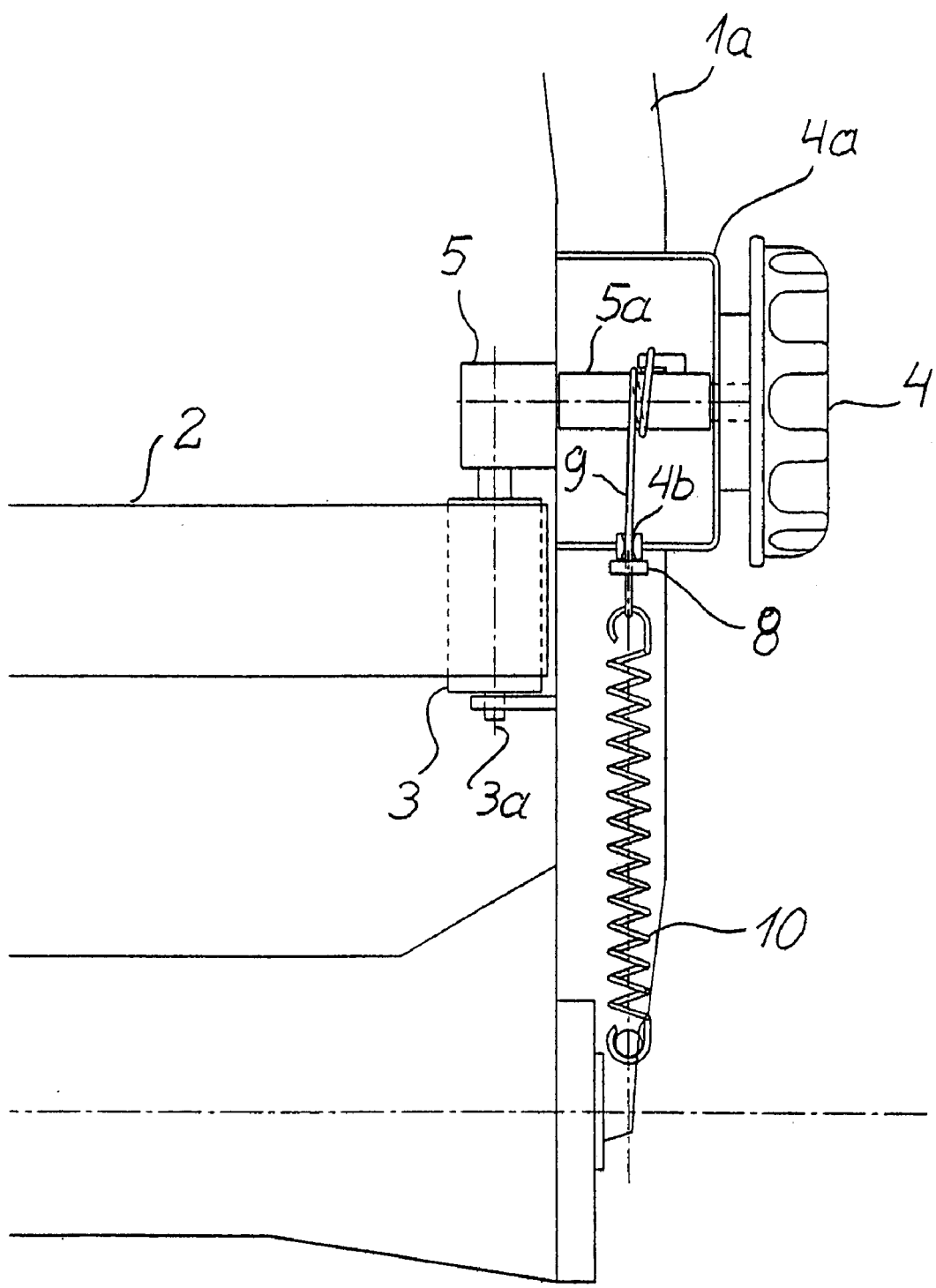
FIG. 4 shows a cut-out of the backrest according to FIG. 1 that is in keeping with FIG. 2, when the lumbar support is tightened.
Figure 5:
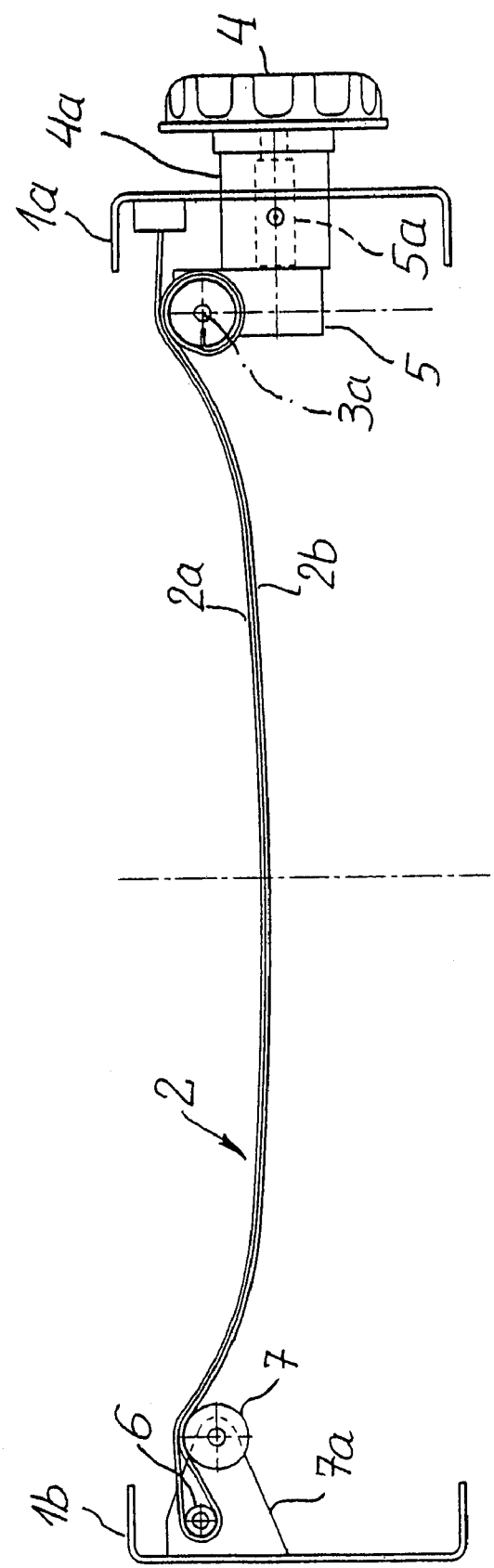
FIG. 5 shows a cross-section through the backrest according to FIG. 1 with a lumbar support in keeping with FIG. 4 that is maximally tightened.

FIGS. 4 and 5 depict belt 2 in its tightened position. Belt 2 is wound up by means of hand-operated wheel 4 onto belt drum 3 in excess of the length that forms the underlying assumption of FIG. 1. Draw rope 9 is unwound off the coil that is depicted in FIG. 2, until it reaches that which is depicted in FIG. 1, and wrapped in the opposite direction, that is, clockwise, onto gear shaft 5a until contact is made once more between stop 8 and the opposing stop 4b of the flange 4a. In the process, belt 2 has been drawn by belt drum 3, by way of deflection roller 6 and guide roller 7.

In the desired position of tension of belt 2, depending on the case, the belt drum 3 is held fast by means of a catching of the hand-operated wheel 4, or by means of self-inhibition in the set of gears 5. The catching or self-inhibition, respectively, cannot be overcome as a result of the spring 10, either.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. Motor vehicle seat with a lumbar support, the lumbar support comprising a belt capable of being stretched between a capping member and an opposite capping member, wherein the belt is placed under varying degrees of stress by winding one end of the belt onto a belt drum with a substantially vertical winding axis, and wherein the belt drum is rotated by turning a hand-operated wheel in union with a set of gears.

2. Motor vehicle seat according to claim 1, wherein the set of gears comprises an angular gear and wherein the hand-operated wheel runs parallel to a lateral surface of a rest.

3. Motor vehicle seat according to claim 1, wherein the belt drum is capable of being fixed in various positions of rotation.

4. Motor vehicle seat according to claim 1, wherein the set of gears is self-inhibiting.

5. Motor vehicle seat according to claim 1, wherein an opposite end of the belt is secured to the capping member, and the belt is deflected about the opposite capping member.

6. Motor vehicle seat according to claim 5, wherein the belt is deflected about a deflection roller attached to the opposite capping member.

7. Motor vehicle seat according to claim 1, wherein the belt comprises a first portion arranged parallel to a second portion of the belt that runs in the opposite direction, and surfaces of the first and second portion make contact.

8. A motor vehicle seat according to claim 1, wherein rotation of the belt drum is limited in either direction of rotation by a stop provided on a draw rope.

9. A motor vehicle seat according to claim 8, wherein the draw rope is attached to a spring.

10. A motor vehicle seat according to claim 8, wherein the draw rope is wound about a gear shaft in union with the hand-operated wheel.

11. Motor vehicle seat according to claim 1, wherein the opposite capping piece includes a guide roller.

* * * * *